United States Patent
Zhao et al.

(10) Patent No.: US 9,086,515 B2
(45) Date of Patent: Jul. 21, 2015

(54) DIRECT TYPE BACKLIGHT AND DISPLAY DEVICE

(71) Applicants: BOE Technology Group Co., Ltd., Beijing (CN); Beijing BOE Chatani Electronics Co., Ltd., Beijing (CN)

(72) Inventors: Yang Zhao, Beijing (CN); Zhendong Zhou, Beijing (CN)

(73) Assignees: BOE Technology Group Co., Ltd., Beijing (CN); Beijing BOE Chatani Electronics Co., Ltd., Beijing (CN)

(*) Notice: Subject to any disclaimer, the term of this patent is extended or adjusted under 35 U.S.C. 154(b) by 0 days.

(21) Appl. No.: 14/062,362

(22) Filed: Oct. 24, 2013

(65) Prior Publication Data
US 2014/0168949 A1    Jun. 19, 2014

(30) Foreign Application Priority Data
Dec. 13, 2012    (CN) .......................... 2012 1 0541392

(51) Int. Cl.
*G09F 13/04*    (2006.01)
*F21V 8/00*    (2006.01)

(52) U.S. Cl.
CPC ............ *G02B 6/0041* (2013.01); *G02B 6/0021* (2013.01); *G02B 6/0055* (2013.01); *G02B 6/0065* (2013.01)

(58) Field of Classification Search
CPC ............................. G02B 6/004; G02B 6/0041
USPC ....................................... 362/97.1, 97.2, 97.3
See application file for complete search history.

(56) References Cited

U.S. PATENT DOCUMENTS

| | | | |
|---|---|---|---|
| 7,780,312 B2* | 8/2010 | Han et al. | 362/235 |
| 8,267,537 B2* | 9/2012 | Park | 362/97.3 |

(Continued)

FOREIGN PATENT DOCUMENTS

| | | |
|---|---|---|
| CN | 101256307 A | 9/2008 |
| CN | 102116443 A | 7/2011 |

(Continued)

OTHER PUBLICATIONS

First Office Action and Search Report issued by Chinese Patent Office for priority application 201210541392.3 issued Jun. 26, 2014 with English translation.

*Primary Examiner* — Ali Alavi
(74) *Attorney, Agent, or Firm* — Frommer Lawrence & Haug LLP; Ronald R. Santucci

(57) ABSTRACT

The present invention provides a direct type backlight and a display device provided with the direct type backlight. The direct type backlight includes: a backplate; a printed circuit board fixed on the backplate; a number of LED lamp units fixed on the printed circuit board; side frames fixed on inner side walls of the backplate; reflection sheets covering inner wall of cavity formed by the printed circuit board and the side frames, said reflection sheets have lamp holes matching the LED lamp units; outer frames fixed on upper sides of the backplate and the side frames; said direct type backlight further including: a silica gel light guide plate which this the cavity formed by the printed circuit board and the side frames to cover the reflection sheets and the LED lamp units; and optical film disposed on upper surface of the silica gel light guide plate and located between the upper surface of the silica gel light guide plate and the outer frames. By diffusing the light rays emitted from the LED lamps through the silica gel light guide plate, the mixing distance of the LED lamp is shortened, thus the thickness of the direct type backlight is reduced and the display device becomes much thinner.

20 Claims, 3 Drawing Sheets

(56) References Cited

U.S. PATENT DOCUMENTS

2008/0086922 A1* 4/2008 Chen et al. ..................... 40/550
2011/0164402 A1 7/2011 Kang et al.

FOREIGN PATENT DOCUMENTS

| CN | 102818193 A | 12/2012 |
| WO | WO 2005/124401 A | 12/2005 |

* cited by examiner

DIRECT TYPE BACKLIGHT AND DISPLAY DEVICE

TECHNICAL FIELD

The present invention relates to the field of liquid crystal display technology, and more particularly relates to a direct type backlight and a display device.

BACKGROUND ART

In addition to panel, backlight is the most important component determining the picture quality of a display device in the display device, the illumination effect thereof directly determines whether the quality of the display picture of the display device is good or not. With the increasing requirements of enjoyment, people's requirements on the picture of the display device are getting higher and higher. In order to meet the needs of customers, manufacturers are continuously improving the effects of the backlight, and have developed various light sources such as EL (ElectroLuminescence), CCFL (Cold Cathode Fluorescent Lamp), HCFL (Hot Cathode Fluorescent Lamp) and today's LED (Light Emitting Diode). Among these light sources, LED lamp has undoubtably become the best light source in the current display devices for its good lighting effects and low price. As shown in FIGS. 1 and 2, FIG. 1 is the front structural schematic view of an existing direct type backlight and FIG. 2 is a cross-sectional structural schematic view of an existing direct type backlight, the existing direct type backlight includes: a backplate 10, a printed circuit board 30 disposed on the backplate 10, LED lamps 33 disposed on the printed circuit board 30 by LED lamp holders 32, side frames 20 provided on the inner wall of the backplate 10, reflection sheets 40 covering the wall of the cavity formed by the printed circuit board 30 and the side frames 20, a diffusion plate 90 disposed on the side frames 20, an optical film 70 disposed on the diffusion plate 90 and outer frames 80 stuck on the outsides of the backplate 10 and the optical film 70. During operation of the existing direct type backlight, light rays emitted from the LED lamps 33 irradiate on the diffusion plate 90 and the optical film 70 through the air layer between the LED lamps 33 and the diffusion plate 90, and the point light emitted from the LED lamps 33 are diffused into surface light through the diffusion plate 90.

Defect existing in the prior art is that, in order to provide uniform brightness on the displays screen, the light rays emitted from the LED lamps 33 to the display screen must be mixed, and therefore, certain mixing distance has to be presented between the LED lamps 33 and the optical film 70. In existing direct type backlight, the LED lamps 33 irradiate the optical film 70 through the air layer and the diffusion plate 90, which causes that the thickness of the direct type backlight cannot be further reduced, and therefore the thickness of the display device is affected. In addition, as the optical film 70 is directly disposed above the air layer, the optical film 70 is apt to deform for lacking support. Light rays transmitted through the deformed optical film 70 become nonuniform, which lowers the display quality of a display device adopting the existing backlight.

SUMMARY

The present invention provides a direct type backlight and a display device, which can shorten the mixing distance of LED lamp, and thus further reducing the thickness of the display device.

According to one aspect of the present invention, there is provided a direct type backlight, including: a backplate; a printed circuit board fixed on the backplate; a number of LED lamp units fixed on the printed circuit board; side frames fixed on inner side walls of the backplate; reflection sheets covering inner wall of cavity formed by the printed circuit board and the side frames, said reflection sheets have lamp holes matching the LED lamp units; outer frames fixed on upper sides of the backplate and the side frames; said direct type backlight further including: a silica gel light guide plate which fills the cavity formed by the printed circuit board and the side frames to cover the reflection sheets and the LED lamp units; and optical film disposed on the upper surface of the silica gel light guide plate and located between the upper surface of the silica gel light guide plate and the outer frames.

Optionally, the LED lamp unit includes a LED lamp holder and a LED lamp fixed onto the LED lamp holder.

Optionally, the LED lamp unit includes a LED lamp.

Preferably, said printed circuit board is fixed to the backplate using thermally conductive adhesive tape.

Preferably, said silica gel light guide plate is formed by integrated injection molding.

Preferably, said printed circuit board is aluminum-based printed circuit board.

Preferably, the silica gel light guide plate is provided with diffusing particles therein.

Preferably, the diffusing particles are acrylic particles.

According to another aspect of the present invention, there is provided a display device including any of the above-mentioned direct typo backlights.

Advantageous effects of the present invention are as follows: by diffusing the light rays emitted from the LED lamps through the silica gel light guide plate, the mixing distance of the LED lamps is shortened, thus the thickness of the direct type backlight is reduced and the display device becomes thinner. Since the optical film is disposed on the silica gel light guide plate, the silica gel light guide plate in solid state can support the optical film, thereby preventing the optical performance of the optical film from degrading due to deforming caused by lack of support, and thus improving the display quality of the display device adopting this direct type backlight.

DETAILED DESCRIPTION OF THE PREFERRED EMBODIMENTS

In order to shorten mixing distance of LED lamps, and further reduce thickness of a direct type backlight such that a display device can be made thinner, embodiments of the present invention provide a direct type backlight and a display device. In the technical solution of the present invention, a silica gel light guide plate is filled between the LED lamps and the optical film. Light rays emitted from the LED lamps irradiate directly onto the optical film after being diffused by the silica gel light guide plate, such that the mixing distance of the LED lamps is shortened and the thickness of the direct type backlight is reduced. The object, technical solutions and advantages of the present invention will become more apparent through the following embodiments illustrating the present invention in further detail.

Hereinafter, for convenience of explanation, take the placement direction of the direct type backlight according to an embodiment of the present invention shown in FIG. 3 as reference direction. However, the reference direction is not limited thereto, and may be any direction.

Figure 1:
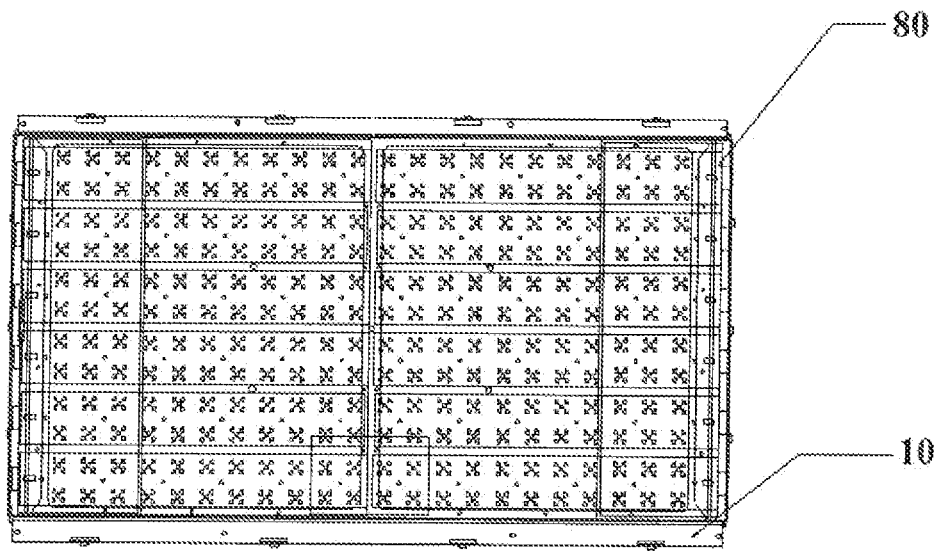
FIG. 1 is a front top schematic view of the structure of a conventional direct type backlight.
Figure 2:
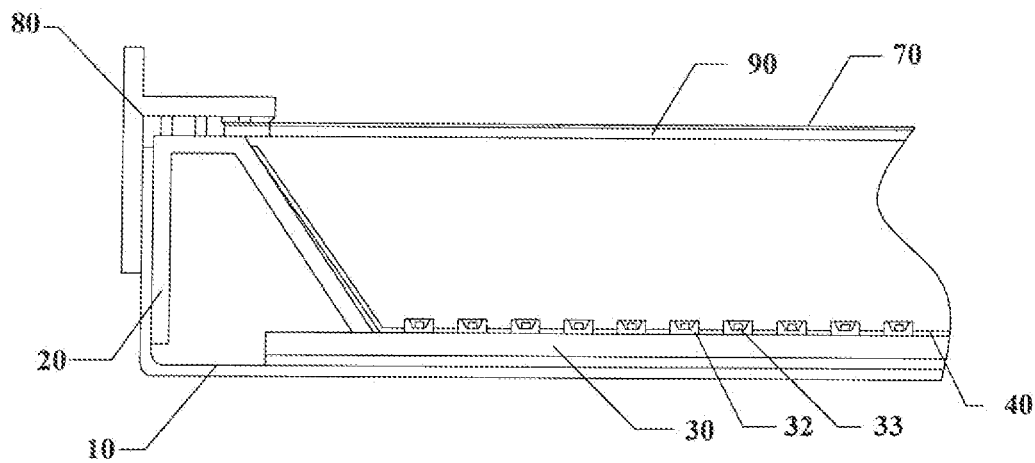
FIG. 2 is the cross-sectional schematic view of the structure of the conventional direct type backlight.
Figure 3:
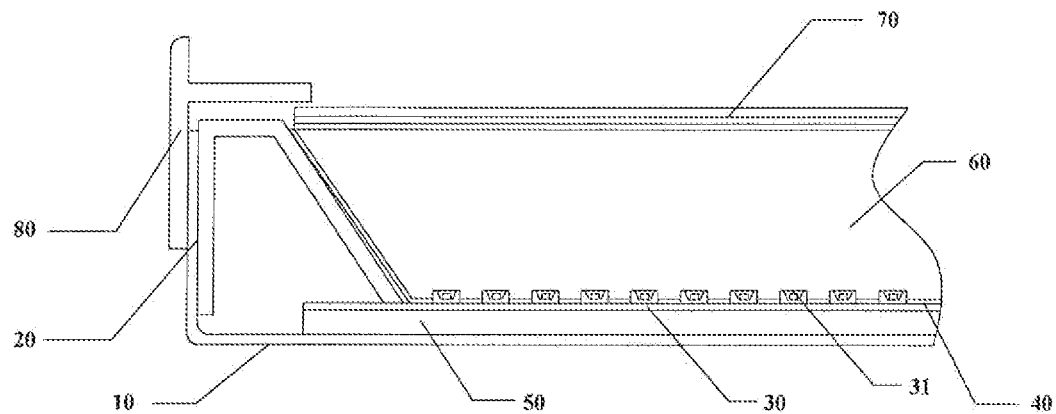
FIG. 3 is a cross-sectional schematic view of the structure of a direct type backlight according to an embodiment of the present invention.

As shown in FIG. 3, the direct type backlight according to an embodiment of the present invention includes: a backplate 10; a printed circuit board 30 fixed on the backplate 10; a number of LED lamp units 31 fixed on the printed circuit board 30; side frames 20 fixed on inner side walls of the backplate 10; reflection sheets 40 covering inner wall of cavity formed by the printed circuit board 30 and the side frames 20, said reflection sheets 40 have lamp holes matching the LED lamp units 31; outer frames 80 fixed on upper sides of the backplate 10 and the side frames 20. The direct type backlight further includes: a silica gel light guide plate 60 which fills the cavity formed by the printed circuit board 30 and the side frames 20 to cover the reflection sheets 40 and the LED lamp units 31, and optical film 70 disposed on upper surface of the silica gel light guide plate 60 and located between the upper surface of the silica gel light guide plate 60 and the outer frames 80.

In this embodiment, light rays emitted from the LED lamp units 31 are diffused by the silica gel light guide plate 60 and then irradiate directly onto the optical film 70 disposed on the upper surface of the silica gel light guide plate 60. Compared to the prior art, in the direct type backlight according to the embodiment of the present invention, the kinds of media through which the light rays emitted from the LED lamp units 31 transmit are reduced, at the same time the mixing distances of the LED lamp units 31 are shortened by the diffusion through the silica gel light guide plate 60, and accordingly, the thickness of the direct type backlight can be further reduced. In addition, Fresnel interface loss will occur at media interface when light rays passing through different media, i.e. there will be losses in the reflection at medium boundary when light rays pass through a medium to another medium. In the direct type backlight according to the embodiment of the present invention, the kinds of media through which the light rays emitted from the LED lamp units 31 transmit are reduced, thereby the Fresnel interface loss of the light rays at the media interfaces is reduced and the efficiency of the direct type backlight is improved.

In the embodiment, the silica gel light guide plate 60 is formed by way of integrated injection molding, i.e. performing the injection using the semi-finished direct type backlight assembled with reflection sheets 40 as part of the module, wherein the optical silica gel ejected from a silica gel injection molding machine is directly injected into the cavity which is surrounded and formed by the reflection sheets 40 covering the inner wall of cavity formed by the printed circuit board 30 and the side frames 20. After molding, the injected optical silica gel will be integrated with the assembled semi-finished direct type backlight, therefore, there is no gap between the silica gel light guide plate 60 and the LED lamp units 31, and the light rays emitted from the LED lamp units 31 will directly irradiate onto the silica gel light guide plate 60.

Figure 4:
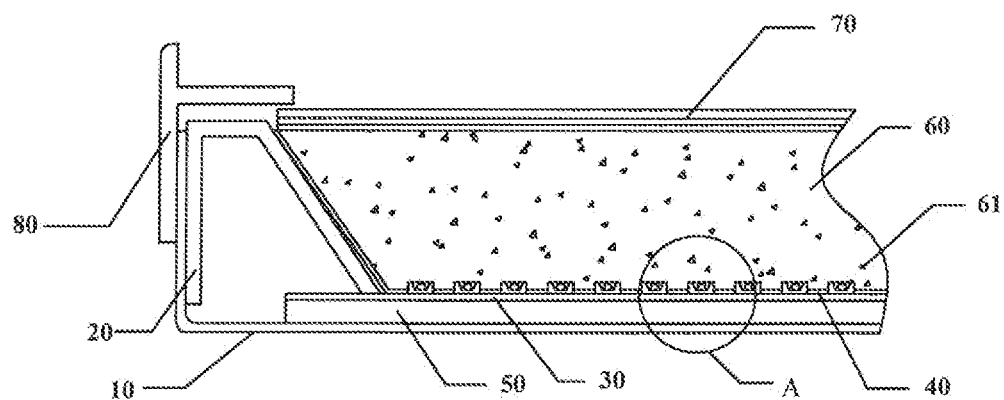
FIG. 4 is a cross-sectional schematic view of the structure of a direct type backlight according to another embodiment of the present invention.
Figure 5:
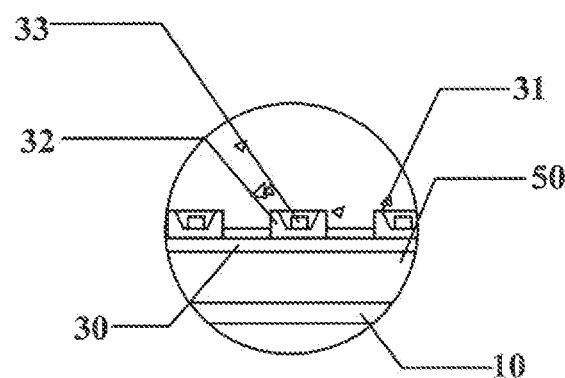
FIG. 5 is a partial enlarged view at A in FIG. 4.

As shown in FIGS. 4 and 5, there is provided a direct type backlight according to another embodiment of the present invention. In this embodiment, the silica gel light guide plate 60 has diffusing particles 61 therein, the diffusing particles 61 may be various particles with scattering function, such as acrylic particles. The acrylic particles dispersed in the silica gel light guide plate 60 can change the propagation direction of the light rays in the silica gel light guide plate 60, and scatter the light rays emitted from the LED lamp units 31 in a wider angle, therefore the mixing distances of the LED lamp units 31 are effectively shortened and the thickness of the direct type backlight is further reduced.

Referring to FIG. 5 continuously, the LED lamp unit 31 includes a LED lamp holder 32 and a LED lamp 33 fixed onto the LED lamp holder 32. The printed circuit board 30 is aluminum-based printed circuit board and is fixed to the backplate 10 using thermally conductive adhesive tape 50, therefore the heat generated by the LED lamp units 31 can be transferred rapidly to the backplate 10, such that the impact of the heat generated by the LED lamp units 31 on the LED lamp units 31 and other components in the direct type backlight is effectively reduced.

Figure 6:
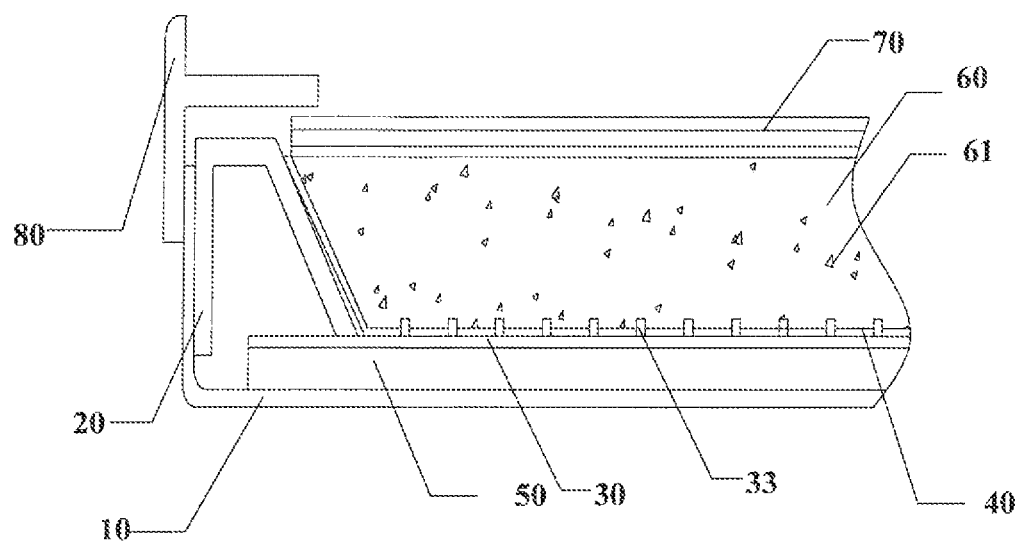
FIG. 6 is a cross-sectional schematic view of the structure of a direct type backlight according to still another embodiment of the present invention.

As shown in FIG. 6, as a preferred embodiment, the LED lamp unit 31 includes a LED lamp 33 which is a three primary color flip-chip LED lamp 33; the LED lamp 33 is mounted directly on the printed circuit board 30. Since no LED lamp holder 32 is used, the diverging angle of the LED lamp 33 is not limited. One part of the divergent light rays irradiates directly onto the optical film 70 after being scattered by the silica gel light guide plate 60 and the acrylic particles, and the other part of the divergent light rays irradiates onto the optical film 70 after being reflected by the reflection sheets 40 and then scattered by the silica gel light guide plate 60 and the acrylic particles. With such structure, the mixing distances of the LED lamps 33 can be further shortened without loss in light efficiency of the LED lamps 33, and accordingly the thickness of the direct type backlight is further reduced.

The display device according to the embodiments of the present invention includes the direct type backlight of any one of the above embodiments, and has relatively thin thickness and good picture quality.

Apparently, person skilled in the art can make various modifications and variations without departing from the spirit and the scope of the present invention. As such, the present invention is intended to include these modifications and variations if these modifications and variations belong to the scope of the claims and their equivalents.

The invention claimed is:

1. A direct type backlight, including: a backplate; a printed circuit board fixed on the backplate; a number of LED lamp units fixed on the printed circuit board; side frames fixed on inner side walls of the backplate; reflection sheets covering inner wall of cavity formed by the printed circuit board and the side frames, said reflection sheets have lamp holes matching the LED lamp units; and outer frames fixed on the upper sides of the backplate and the side frames, characterized in that, further including: a silica gel light guide plate which fills the cavity formed by the printed circuit board and the side frames to cover the reflection sheets and the LED lamp units; and optical film disposed on upper surface of the silica gel light guide plate and located between the upper surface of the silica gel light guide plate and the outer frames, wherein the silica gel light guide plate supports the optical film.

2. The direct type backlight according to claim 1, characterized in that the LED lamp units include LED lamp holders and LED lamps fixed onto the LED lamp holders.

3. The direct type backlight according to claim 1, characterized in that the LED lamp units include LED lamps.

4. The direct type backlight according to claim 1, characterized in that the printed circuit board is fixed to the backplate using thermally conductive adhesive tape.

5. The direct type backlight according to claim 1, characterized in that the printed circuit board is aluminum-based printed circuit board.

6. The direct type backlight according to claim 4, characterized in that the printed circuit board is aluminum-based printed circuit board.

7. The direct type backlight according to claim 1, characterized in that the silica gel light guide plate is provided with diffusing particles therein.

8. The direct type backlight according to claim 7, characterized in that the diffusing particles are acrylic particles.

9. The direct type backlight according to claim 1, characterized in that the silica gel light guide plate is formed by integrated injection molding.

10. The direct type backlight according to claim 7, characterized in that the silica gel light guide plate is formed by integrated injection molding.

11. A display device, characterized in that, including a direct type backlight, wherein the direct type backlight includes: a backplate; a printed circuit board fixed on the backplate; a number of LED lamp units fixed on the printed circuit board; side frames fixed on inner side walls of the backplate; reflection sheets covering inner wall of cavity formed by the printed circuit board and the side frames, said reflection sheets have lamp holes matching the LED lamp units; and outer frames fixed on the upper sides of the backplate and the side frames, characterized in that, the direct type backlight further includes: a silica gel light guide plate which fills the cavity formed by the printed circuit board and the side frames to cover the reflection sheets and the LED lamp units; and optical film disposed on upper surface of the silica gel light guide plate and located between the upper surface of the silica gel light guide plate and the outer frames, wherein the silica gel light guide plate supports the optical film.

12. A display device according to claim 11, characterized in that, the LED lamp units include LED lamp holders and LED lamps fixed onto the LED lamp holders.

13. A display device according to claim 11, characterized in that the LED lamp units include LED lamps.

14. A display device according to claim 11, characterized in that the printed circuit board is fixed to the backplate using thermally conductive adhesive tape.

15. A display device according to claim 11, characterized in that the printed circuit board is aluminum-based printed circuit board.

16. A display device according to claim 14, characterized in that the printed circuit board is aluminum-based printed circuit board.

17. A display device according to claim 11, characterized in that the silica gel light guide plate is provided with diffusing particles therein.

18. A display device according to claim 17, characterized in that the diffusing particles are acrylic particles.

19. A display device according to claim 11, characterized in that the silica gel light guide plate is formed by integrated injection molding.

20. A display device according to claim 17, characterized in that the silica gel light guide plate is formed by integrated injection molding.

* * * * *